(12) United States Patent
Shimura et al.

(10) Patent No.: US 9,070,223 B2
(45) Date of Patent: Jun. 30, 2015

(54) IMAGE PROCESSING DEVICE, IMAGE PROCESSING METHOD, AND IMAGE PROCESSING PROGRAM

(75) Inventors: Tomoya Shimura, Osaka (JP); Seiichi Tanaka, Osaka (JP); Shinichi Arita, Osaka (JP); Takuya Okamoto, Osaka (JP); Takashi Yasumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 13/990,464

(22) PCT Filed: Sep. 13, 2011

(86) PCT No.: PCT/JP2011/070832
§ 371 (c)(1),
(2), (4) Date: May 30, 2013

(87) PCT Pub. No.: WO2012/073575
PCT Pub. Date: Jun. 7, 2012

(65) Prior Publication Data
US 2013/0279799 A1 Oct. 24, 2013

(30) Foreign Application Priority Data

Dec. 3, 2010 (JP) ................................. 2010-270735

(51) Int. Cl.
*G06T 19/20* (2011.01)
*G06T 5/20* (2006.01)
*G06T 5/00* (2006.01)

(52) U.S. Cl.
CPC . *G06T 19/20* (2013.01); *G06T 5/20* (2013.01); *G06T 5/003* (2013.01); *G06T 2207/10028* (2013.01)

(58) Field of Classification Search
USPC .......................... 382/100, 154, 254, 260–275; 345/419–427; 356/12; 348/42
See application file for complete search history.

(56) References Cited

U.S. PATENT DOCUMENTS

| | | | |
|---|---|---|---|
| 6,163,337 A | 12/2000 | Azuma et al. | |
| 2002/0158888 A1 | 10/2002 | Kitsutaka | |
| 2003/0026474 A1* | 2/2003 | Yano | 382/154 |
| 2008/0226179 A1 | 9/2008 | Dohta | |
| 2008/0273751 A1* | 11/2008 | Yuan et al. | 382/103 |
| 2009/0109304 A1 | 4/2009 | Guan | |
| 2010/0002073 A1* | 1/2010 | Robinson et al. | 348/42 |
| 2011/0150349 A1 | 6/2011 | Kojima et al. | |
| 2011/0249886 A1* | 10/2011 | Park et al. | 382/154 |
| 2011/0304708 A1* | 12/2011 | Ignatov | 348/51 |

(Continued)

FOREIGN PATENT DOCUMENTS

| | | |
|---|---|---|
| CN | 102104728 A | 6/2011 |
| JP | 09-181966 A | 7/1997 |

(Continued)

OTHER PUBLICATIONS

Official Communication issued in International Patent Application No. PCT/JP2011/070832, mailed on Nov. 29, 2011.

*Primary Examiner* — Anand Bhatnagar
(74) *Attorney, Agent, or Firm* — Keating & Bennett, LLP

(57) ABSTRACT

An image processing device includes a map filtering processing unit which applies filtering to a parallax map based on a parallax value with respect to each pixel of an image; a blurred image generation unit which generates a blurred image of the image from the image; and an image composition unit which generates a composite image which is obtained by compositing the image and the blurred image based on the parallax map after the filtering by the map filtering processing unit.

6 Claims, 13 Drawing Sheets

(56) References Cited

U.S. PATENT DOCUMENTS

2012/0070069 A1 3/2012 Taguchi et al.
2012/0147205 A1* 6/2012 Lelescu et al. ............. 348/218.1

FOREIGN PATENT DOCUMENTS

| JP | 2001-175884 | A | 6/2001 |
| JP | 3262772 | B2 | 3/2002 |
| JP | 2004-007707 | A | 1/2004 |
| JP | 3733359 | B2 | 1/2006 |
| JP | 2006-067521 | A | 3/2006 |
| JP | 2008-225767 | A | 9/2008 |
| JP | 2009-110137 | A | 5/2009 |
| JP | 2011-130169 | A | 6/2011 |
| JP | 4793933 | B2 | 10/2011 |
| JP | 2012-063987 | A | 3/2012 |

* cited by examiner

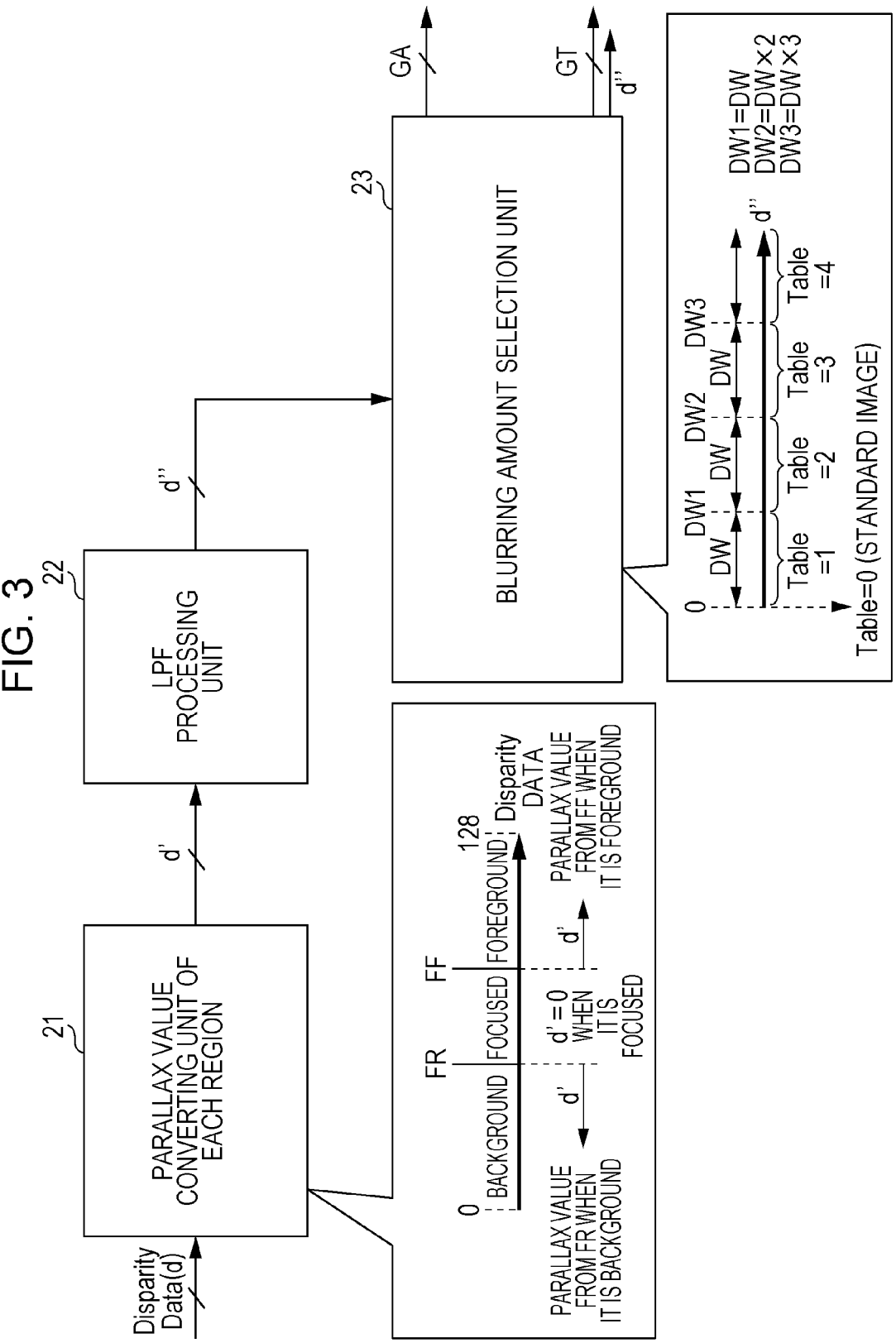

| 0.0386 | 0.209 | 0.0386 |
|---|---|---|
| 0.0412 | 0.3446 | 0.0412 |
| 0.0386 | 0.209 | 0.0386 |

| 0.0103 | 0.0142 | 0.0171 | 0.0183 | 0.0171 | 0.0142 | 0.0103 |
|---|---|---|---|---|---|---|
| 0.0142 | 0.0195 | 0.0236 | 0.0251 | 0.0236 | 0.0195 | 0.0142 |
| 0.0171 | 0.0236 | 0.0285 | 0.0304 | 0.0285 | 0.0236 | 0.0171 |
| 0.0183 | 0.0251 | 0.0304 | 0.0324 | 0.0304 | 0.0251 | 0.0183 |
| 0.0171 | 0.0236 | 0.0285 | 0.0304 | 0.0285 | 0.0236 | 0.0171 |
| 0.0142 | 0.0195 | 0.0236 | 0.0251 | 0.0236 | 0.0195 | 0.0142 |
| 0.0103 | 0.0142 | 0.0171 | 0.0183 | 0.0171 | 0.0142 | 0.0103 |

FIG. 8

| 0.002038 | 0.002388 | 0.002732 | 0.003049 | 0.003321 | 0.00353 | 0.003661 | 0.003706 | 0.003661 | 0.00353 | 0.003321 | 0.003049 | 0.002732 | 0.002388 | 0.002038 |
|---|---|---|---|---|---|---|---|---|---|---|---|---|---|---|
| 0.002388 | 0.002799 | 0.003201 | 0.003573 | 0.003892 | 0.004137 | 0.004291 | 0.004344 | 0.004291 | 0.004137 | 0.003892 | 0.003573 | 0.003201 | 0.002799 | 0.002388 |
| 0.002732 | 0.003201 | 0.003661 | 0.004087 | 0.004451 | 0.004731 | 0.004908 | 0.004968 | 0.004908 | 0.004731 | 0.004451 | 0.004087 | 0.003661 | 0.003201 | 0.002732 |
| 0.003049 | 0.003573 | 0.004087 | 0.004561 | 0.004968 | 0.005281 | 0.005478 | 0.005545 | 0.005478 | 0.005281 | 0.004968 | 0.004561 | 0.004087 | 0.003573 | 0.003049 |
| 0.003321 | 0.003892 | 0.004451 | 0.004968 | 0.005411 | 0.005752 | 0.005966 | 0.006039 | 0.005966 | 0.005752 | 0.005411 | 0.004968 | 0.004451 | 0.003892 | 0.003321 |
| 0.00353 | 0.004137 | 0.004731 | 0.005281 | 0.005752 | 0.006114 | 0.006342 | 0.00642 | 0.006342 | 0.006114 | 0.005752 | 0.005281 | 0.004731 | 0.004137 | 0.00353 |
| 0.003661 | 0.004291 | 0.004908 | 0.005478 | 0.005966 | 0.006342 | 0.006578 | 0.006659 | 0.006578 | 0.006342 | 0.005966 | 0.005478 | 0.004908 | 0.004291 | 0.003661 |
| 0.003706 | 0.004344 | 0.004968 | 0.005545 | 0.006039 | 0.00642 | 0.006659 | 0.006741 | 0.006659 | 0.00642 | 0.006039 | 0.005545 | 0.004968 | 0.004344 | 0.003706 |
| 0.003661 | 0.004291 | 0.004908 | 0.005478 | 0.005966 | 0.006342 | 0.006578 | 0.006659 | 0.006578 | 0.006342 | 0.005966 | 0.005478 | 0.004908 | 0.004291 | 0.003661 |
| 0.00353 | 0.004137 | 0.004731 | 0.005281 | 0.005752 | 0.006114 | 0.006342 | 0.00642 | 0.006342 | 0.006114 | 0.005752 | 0.005281 | 0.004731 | 0.004137 | 0.00353 |
| 0.003321 | 0.003892 | 0.004451 | 0.004968 | 0.005411 | 0.005752 | 0.005966 | 0.006039 | 0.005966 | 0.005752 | 0.005411 | 0.004968 | 0.004451 | 0.003892 | 0.003321 |
| 0.003049 | 0.003573 | 0.004087 | 0.004561 | 0.004968 | 0.005281 | 0.005478 | 0.005545 | 0.005478 | 0.005281 | 0.004968 | 0.004561 | 0.004087 | 0.003573 | 0.003049 |
| 0.002732 | 0.003201 | 0.003661 | 0.004087 | 0.004451 | 0.004731 | 0.004908 | 0.004968 | 0.004908 | 0.004731 | 0.004451 | 0.004087 | 0.003661 | 0.003201 | 0.002732 |
| 0.002388 | 0.002799 | 0.003201 | 0.003573 | 0.003892 | 0.004137 | 0.004291 | 0.004344 | 0.004291 | 0.004137 | 0.003892 | 0.003573 | 0.003201 | 0.002799 | 0.002388 |
| 0.002038 | 0.002388 | 0.002732 | 0.003049 | 0.003321 | 0.00353 | 0.003661 | 0.003706 | 0.003661 | 0.00353 | 0.003321 | 0.003049 | 0.002732 | 0.002388 | 0.002038 |

T3

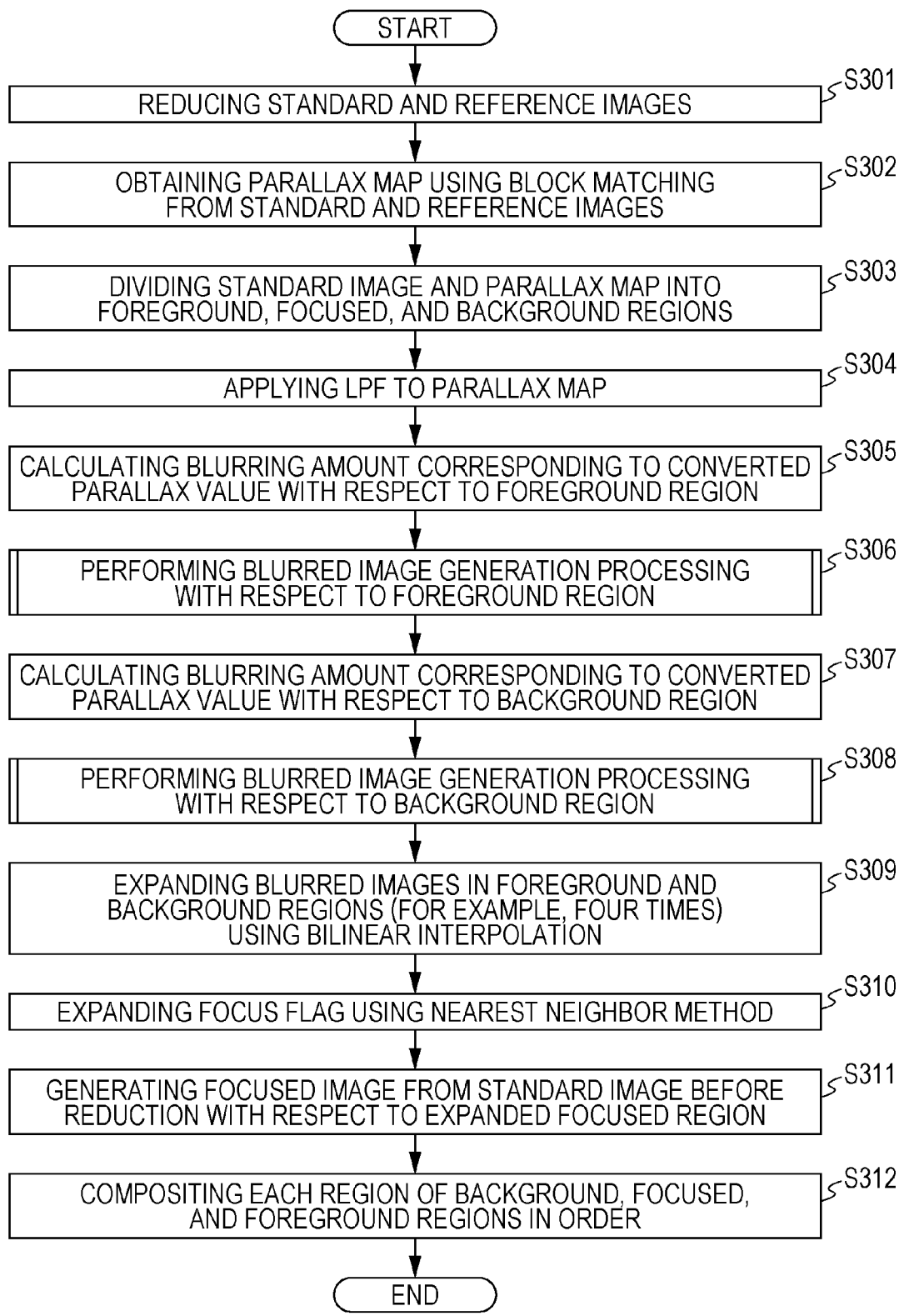

IMAGE PROCESSING DEVICE, IMAGE PROCESSING METHOD, AND IMAGE PROCESSING PROGRAM

TECHNICAL FIELD

The present invention relates to an image processing device, an image processing method, and an image processing program.

The present application claims a priority based on Japanese Patent Application No. 2010-270735 filed on Dec. 3, 2010, the contents of which are incorporated herein by reference.

BACKGROUND ART

When generating an image with the depth, an image generation apparatus generates an image with a clear contour relating to an object which is in a focus region of a camera, and generates an image with a blurred contour relating to an object which is in an out of a focus region of a camera with respect to the depth direction of an image. In this manner, the image generation apparatus generates an image in which a perspective sensation is expressed to be close to a real world.

PTL 1 discloses a parallax estimating method of estimating parallax which discontinuously changes along an object contour line. In the parallax estimating method, initial parallax of two images and a reliability evaluation value of an initial parallax are calculated, and parallax in a region in which the reliability of the initial parallax is low is set to be smoothly connected to the peripheral parallax, and is determined to be changed along the object contour line.

PTL 2 discloses an image generation system which generates an image which is focused like a visual field image of a real world. In the image generation system, a focused image is generated by setting an α value corresponding to a depth value of each pixel of the original image, and by compositing the original image and a blurred image corresponding to the original image based on the α value which is set in each pixel.

In addition, PTL 3 discloses an image processing program which generates a focused image based on a distance from a view point. The image processing program includes a step of setting an α value of each pixel based on a depth value of each pixel of a standard image, and a step of increasing an α value which is set to a pixel of which an α value is small between two pixels which are close to each other. Therefore, the image processing program generates a focused image by compositing a standard image and a blurred image corresponding to the standard image based on the α value which is set in each pixel after the processing by the increasing step.

CITATION LIST

Patent Literature

PTL 1: Japanese Unexamined Patent Application Publication No. 2004-7707
PTL 2: Japanese Unexamined Patent Application Publication No. 2001-175884
PTL 3: Japanese Unexamined Patent Application Publication No. 2008-225767

SUMMARY OF INVENTION

Technical Problem

When estimating parallax as in PTL 1, a parallax map which is expanded to be larger than a size of an object is generated in a parallax map in which a parallax value in each pixel of an image is expressed as an image. Here, the parallax value is the number of pixels which is separated in the horizontal direction in an image of which object points imaged in the images are two, in an image which is imaged at two positions of observation places.

If an image generation apparatus in the related art generates a composite image which is obtained by compositing a standard image and a blurred image, when a parallax map which is expanded to be larger than a size of an object is generated, a background image in the vicinity of a boundary between an object and a background becomes clear in the composite image. That is, in the image generation apparatus in the related art, there has been a problem in that a boundary region between an object and a background becomes unnaturally blurred. The problem has not been solved even in the image generation system, or the image processing program which is disclosed in the PTL 2 and the PTL 3.

Therefore, the present invention has been made in consideration of the above problem, and an object thereof is to provide an image processing device, an image processing method, and an image processing program which are able to generate an image in which a boundary region between an object and a background or a foreground becomes naturally blurred.

Solution to Problem (1) In order to solve the above problem, an image processing device according to an aspect of the present invention includes a map filtering processing unit which applies filtering to a parallax map based on a parallax value with respect to each pixel of an image; a blurred image generation unit which generates a blurred image of the image from the image; and an image composition unit which generates a composite image which is obtained by compositing the image and the blurred image based on a parallax map after the filtering by the map filtering processing unit.

(2) The image processing device may further include a filtering magnitude selection unit which selects a magnitude of an image filtering corresponding to a parallax map which is applied with filtering by the map filtering processing unit, in which the blurred image generation unit may generate the blurred image by applying the image filtering to the image.

(3) The image processing device may further include a region division unit which divides the image into a predetermined region according to the parallax value, and converts a parallax value for each region, in which the map filtering processing unit may apply filtering to the parallax map which is obtained by converting the parallax value by the region division unit.

(4) The image processing device may further include an image reduction unit which reduces a size of the image, in which the blurred image generation unit may generate a blurred image of the image which is reduced by the image reduction unit, and in which an image enlargement unit which enlarges the blurred image of the reduced image to a predetermined size may be further included.

(5) In the image processing device, the blurred image generation unit may include a standard blurred image generation unit which selects a plurality of values from the parallax map, and generates a standard blurred image with a blurring amount corresponding to each of the selected plurality of values; a standard blurred image selection unit which selects a standard blurred image from the standard blurred image based on a comparison between a value of the parallax map after filtering of a target pixel and the selected value for each target pixel of the image; and a pixel value interpolation unit which calculates a pixel value of the target pixel based on a pixel value of a pixel corresponding to a position of the target pixel among the selected standard blurred images, a value of the parallax map after filtering of the target pixel, and the selected value.

(6) In the image processing device, the pixel value interpolation unit may calculate a pixel value of the target pixel by interpolation using a value based on a value of a parallax map after filtering of the target pixel, and the selected value, and a pixel value of a pixel corresponding to a position of the target pixel among the selected standard blurred images.

(7) In addition, an image processing method according to another aspect of the present invention includes applying filtering to a parallax map based on a parallax value with respect to each pixel of an image; generating a blurred image of the image from the image; and generating a composite image which is obtained by compositing the image and the blurred image based on the parallax map after applying the filtering.

(8) In addition, an image processing program according to further another aspect of the present invention causes a computer of an image processing device to execute applying filtering to a parallax map based on a parallax value with respect to each pixel of an image, generating a blurred image of the image from the image, and generating a composite image which is obtained by compositing the image and the blurred image based on the parallax map after applying the filtering.

Advantageous Effects of Invention

According to the present invention, it is possible to generate an image in which a boundary region between an object and a background or a foreground becomes naturally blurred.

BRIEF DESCRIPTION OF DRAWINGS

FIG. 3 is a diagram which describes detailed processing of a blurring coefficient calculation processing unit.

FIG. 6 is a diagram which illustrates an example of kernel which is used when generating an image with a small amount of blurring.

FIG. 7 is a diagram which illustrates an example of kernel which is used when generating an image with a medium amount of blurring.

FIG. 8 is a diagram which illustrates an example of kernel which is used when generating an image with a large amount of blurring.

FIG. 14 is a flowchart which illustrates a flow of processing of the image processing device according to a second embodiment of the present invention.

DESCRIPTION OF EMBODIMENTS

Figure 1:
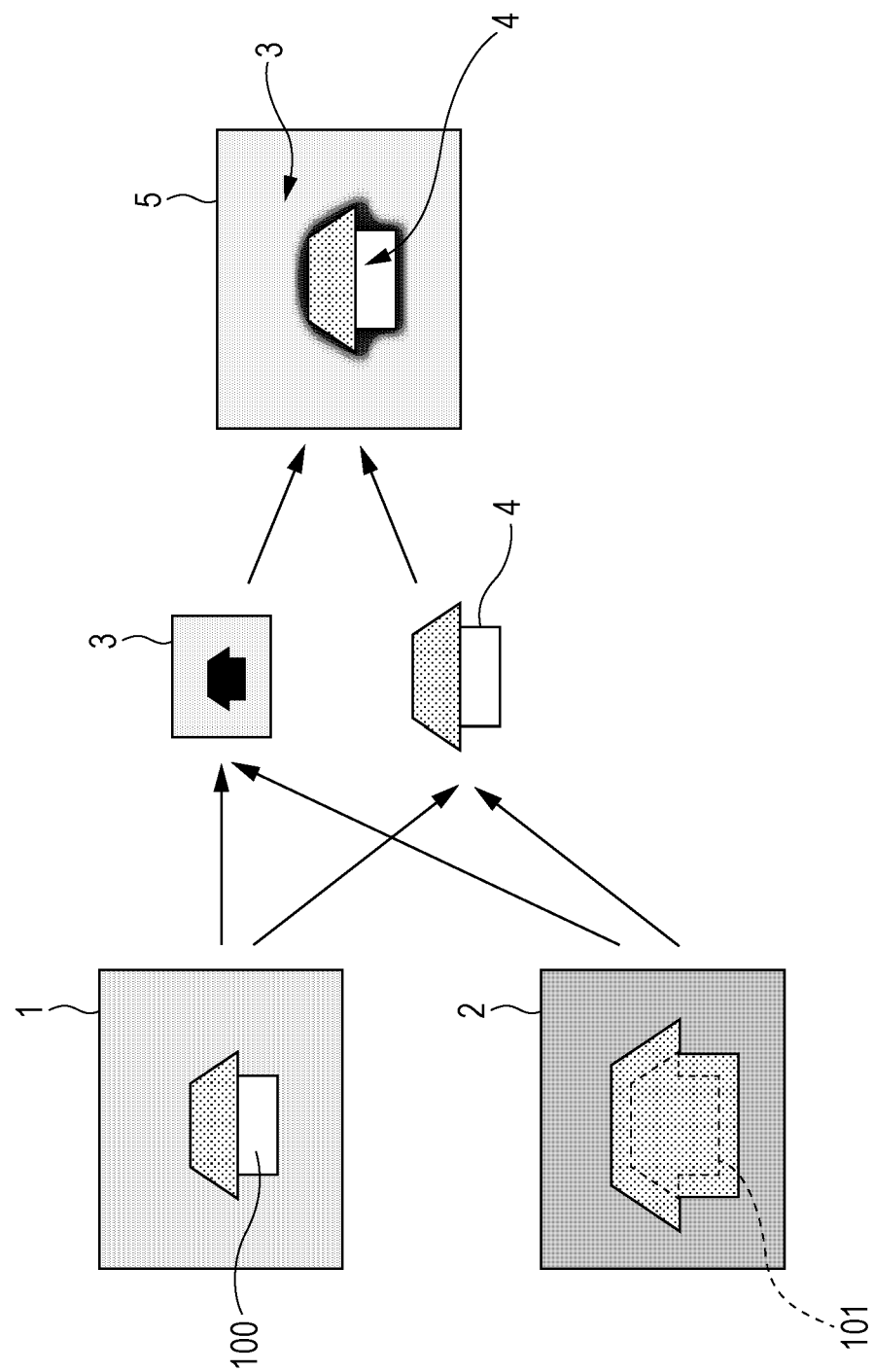
FIG. 1 is a diagram in which schematic processing by an image processing device in each embodiment of the present invention is illustrated.

FIG. 1 is a diagram which illustrates schematic processing by an image processing device in each embodiment of the present invention.

An input image 1 is an image in which a focused (focusing of imaging machine is made) private house 100 (object) of one-storied house is present at the center of a background region on the entire surface, as an example. A parallax map 2 is an image in which a change in parallax of a background region is made smooth when being far from edges 101 of the private house 100 which is focused in the input image 1 toward the background region. Specifically, the parallax map 2 is obtained by applying a Low Pass Filter (LPF) to an image of the private house 100 as the object, and by making a change in parallax of an edge 101 of the object 100 and the background region smooth.

A background blurred image 3 is an image in which the background is performed with blurring processing using the input image 1 and the parallax map 2 is cut out. An object 4 is an image in which the object (private house 100) in a focused region is cut out using the input image 1 and the parallax map 2.

An output image 5 is an image which is obtained by compositing the background blurred image 3, and the image of the object 4 in the focused region. In the output image 5, the edge 101 of the object and a boundary region of the background region are set to be smoothly (naturally) blurred.

<First Embodiment>

Figure 2:
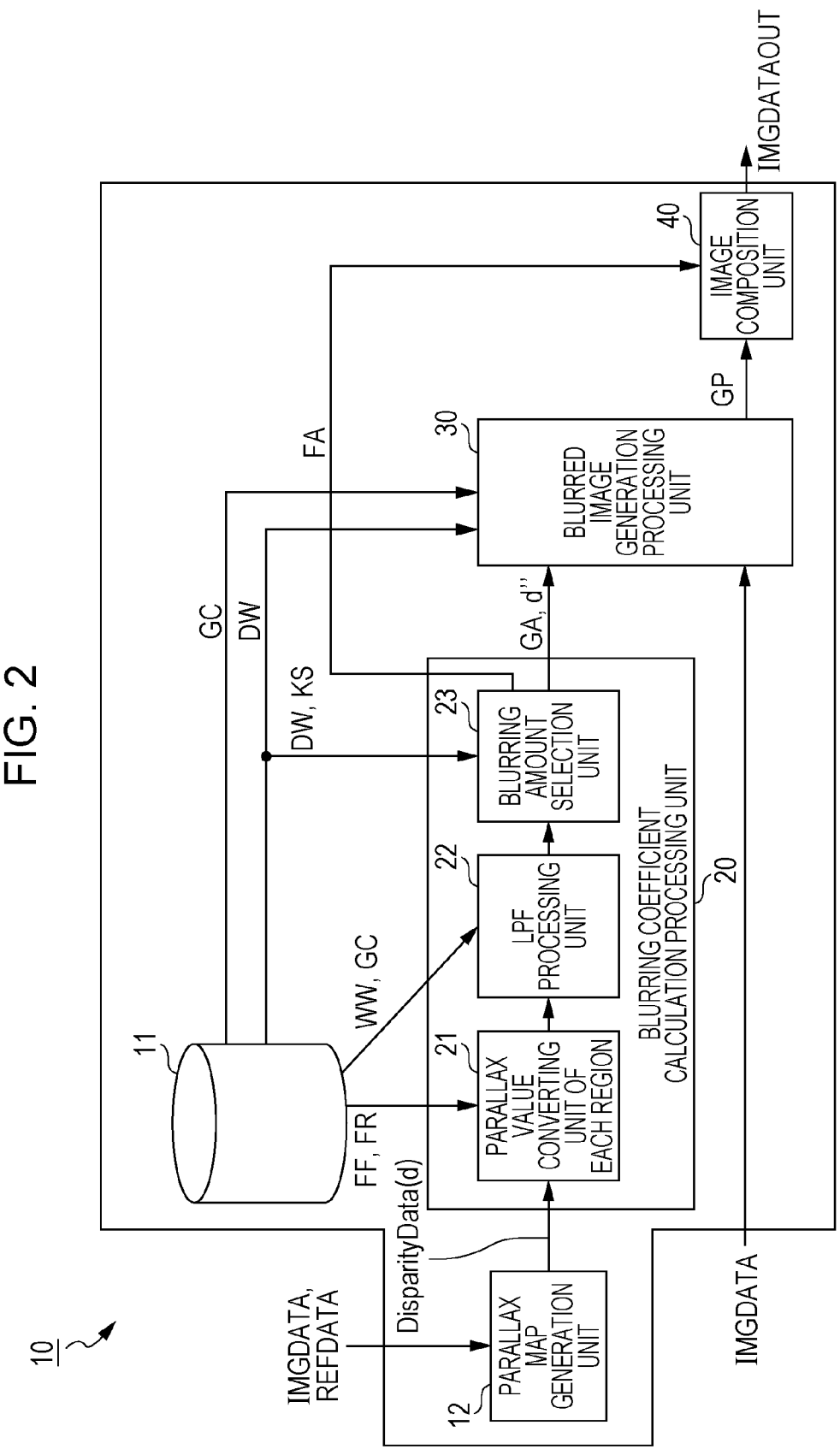
FIG. 2 is a block configuration diagram of the image processing device according to a first embodiment of the present invention.

FIG. 2 is a schematic block diagram which illustrates a configuration of an image processing device 10 according to a first embodiment of the present invention.

The image processing device 10 includes a storage unit 11, a parallax map generation unit 12, a blurring coefficient calculation processing unit 20, a blurred image generation processing unit 30, and an image composition unit 40. In addition, the blurring coefficient calculation processing unit 20 includes a parallax value converting unit of each region (region division unit) 21, an LPF processing unit (also referred to as "filter processing unit") 22, and a blurring amount selection unit (filtering magnitude selection unit) 23.

The storage unit 11 is stored with information which denotes a focused parallax value FF of a foreground boundary which is input from the outside, information which denotes a focused parallax value FR of a background region, information which denotes the step width DW which is the division width when a parallax value is divided in a division, information which denotes a kernel size WW of a LPF, information which denotes a plurality of kernel sizes KS which are kernel sizes used when generating a plurality of standard blurred images, and information which denotes a blurring coefficient GC corresponding to each of the plurality of kernel sizes.

Here, the kernel size WW of the LPF is a window size when generating a parallax map. One of the plurality of kernel sizes KS may be the same value as the kernel size WW of the LPF. In addition, the number of the kernel sizes KS which are stored in the storage unit 11 is the same as the number of blurred images to be generated.

The parallax map generation unit 12 generates a parallax map having a parallax value corresponding to a position of a pixel of each image by a well-known block matching method using a predetermined window size (for example, the same size as the kernel size WW of LPF) from IMGDATA as data of a standard image which is input from the outside, and REFDATA as data of a reference image. The parallax map generation unit 12 outputs Disparity Data as parallax value data which forms a generated parallax map to the parallax value converting unit of each region 21 of the blurring coefficient calculation processing unit 20 which will be described later.

The blurring coefficient calculation processing unit 20 calculates a blurring amount GA (level of blurring) based on the Disparity Data as parallax value data which forms a parallax map which is input from the parallax map generation unit 12. In addition, the blurring coefficient calculation processing unit 20 outputs information denoting the calculated blurring amount GA, and a parallax value d" to the blurred image generation processing unit 30.

The blurred image generation processing unit 30 generates blurred images GP of a foreground region and a background region based on information denoting the input blurring amount GA, and the IMGDATA as the data of the standard image.

FIG. 3 is a diagram which describes detailed processing of the blurring coefficient calculation processing unit 20. The parallax value converting unit of each region 21 reads out the information denoting the focused parallax value FF of the foreground boundary and the information denoting the focused parallax value FR of the background boundary from the storage unit 11.

The parallax value converting unit of each region 21 sets parallax value data d' after converting to FR-d when a value d of the parallax value data Disparity Data which is input from the outside is smaller than the focused parallax value FR of the background boundary, that is, when it is the background region.

On the other hand, the parallax value converting unit of each region 21 sets the parallax value data d' after converting to d-FF when the value d of the parallax value data Disparity Data is larger than the focused parallax value FF of the foreground boundary, that is, when it is the foreground region.

In addition, the parallax value converting unit of each region 21 sets the parallax value data d' after converting to 0 when the value d of the parallax value data Disparity Data is the focused parallax value FR of the background boundary or more, and is the focused parallax value FF of the foreground boundary or less, that is, when it is the focused region.

That is, the parallax value converting unit of each region 21 divides a parallax map which maintains a parallax value of each pixel of an image into a predetermined region according to the parallax value, and converts the parallax value according to the region.

In addition, the parallax value converting unit of each region 21 outputs the parallax value data d' after converting to the LPF processing unit (filter processing unit for map) 22.

The LPF processing unit (filter processing unit for map) 22 reads out information denoting the kernel size WW, and information denoting the blurring coefficient GC from the storage unit 11. The LPF processing unit (filter processing unit for map) 22 applies an LPF to a parallax map which is formed of the parallax value data after d' converting using the read out kernel size WW, and the blurring coefficient GC. In this manner, the LPF processing unit (filter processing unit for map) 22 smoothes between the foreground region, the background region, and the focused region so that the parallax value does not rapidly change.

Continuously, the kernel size WW which is used in the LPF processing unit (filter processing unit for map) 22 in FIG. 2 will be described.

Figure 4A:
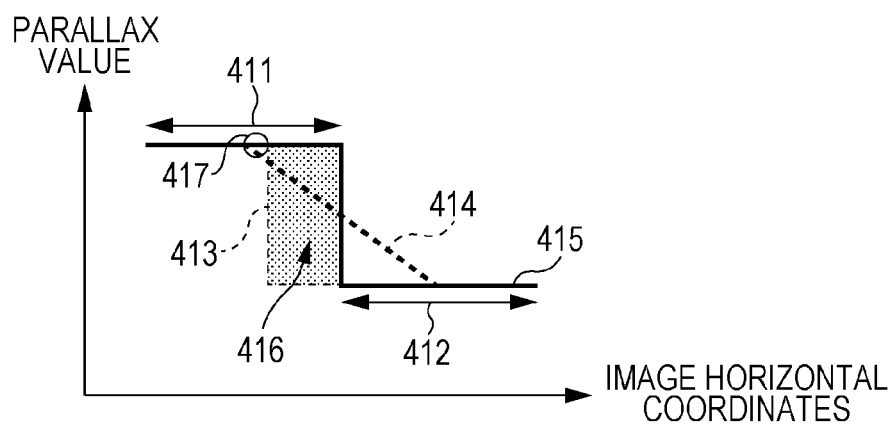
FIG. 4A is a diagram which illustrates a parallax value after applying LPF when the horizontal width of a kernel size of the LPF is larger than the horizontal width of a window size in a case of generating a parallax map.
Figure 4B:
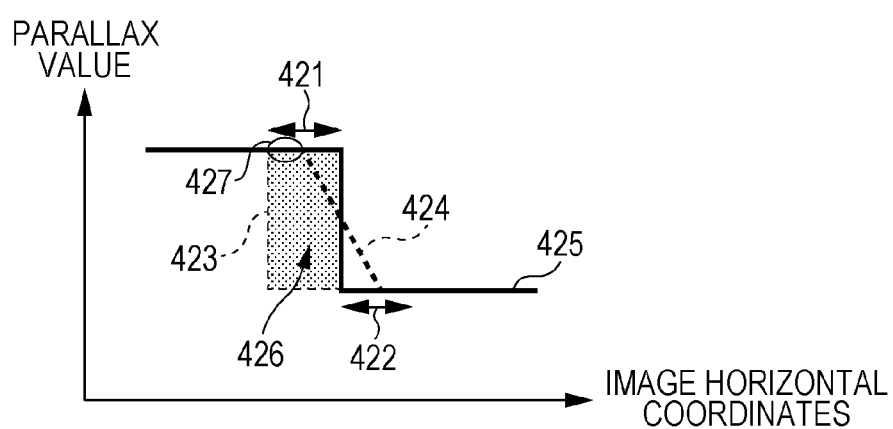
FIG. 4B is a diagram which illustrates a parallax value after applying LPF when the horizontal width of a kernel size of the LPF is a half of the horizontal width of a window size in a case of generating a parallax map.
Figure 4C:
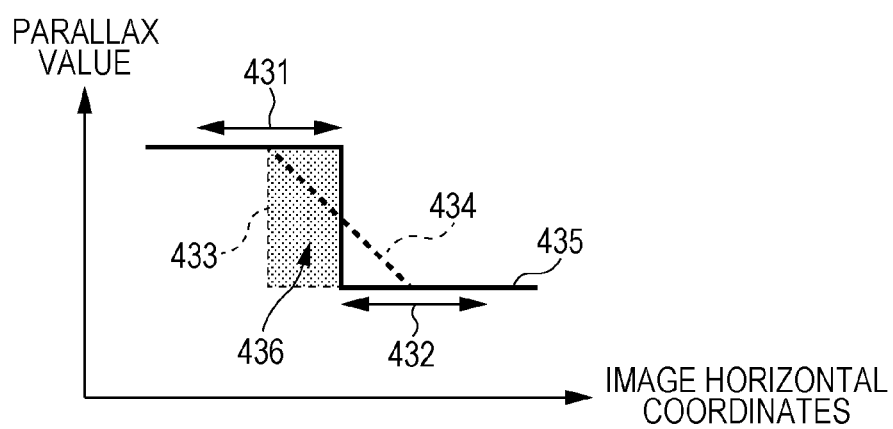
FIG. 4C is a diagram which illustrates a parallax value after applying LPF when the horizontal width of a kernel size of the LPF is the horizontal width of a window size in a case of generating a parallax map.

FIGS. 4A to 4C are diagrams which describe the kernel size WW which is used in the LPF processing unit (filter processing unit for map) 22.

FIG. 4A is a diagram which illustrates a parallax value after applying an LPF when the horizontal width 411 and 412 of the kernel sizes of the LPF are larger than the horizontal width of a window size at the time of generating a parallax map. In addition, in FIG. 4A, the numeral 413 denotes edges of an object. In addition, the numeral 414 denotes a parallax value after applying the LPF. In addition, the numeral 415 denotes a background. In addition, the numeral 416 denotes an expanded region by the half-value width of a window size.

In FIG. 4A, a parallax value before applying the LPF, and a parallax value after applying the LPF with respect to coordinates are illustrated in the horizontal direction of an image (hereinafter, referred to as image horizontal coordinates).

In FIG. 4A, the parallax value after applying the LPF which is denoted by being surrounded with the circle 417 is applied with the LPF as the background region, even though it is a focused region. For this reason, there is a problem in that a part of the focused region of a composite image which corresponds to the parallax value after applying the LPF which is denoted by the circle 417 is blurred.

FIG. 4B is a diagram which illustrates a parallax value after applying an LPF when the horizontal width 421 and 422 of the kernel sizes of the LPF is a half of the horizontal width of a window size at the time of generating a parallax map. In addition, in FIG. 4B, the numeral 423 denotes edges of an object. In addition, the numeral 424 denotes a parallax value after applying the LPF. In addition, the numeral 425 denotes a background. In addition, the numeral 426 denotes an expanded region by the half-value width of the window size.

In FIG. 4B, a parallax value before applying the LPF, and a parallax value after applying the LPF with respect to image horizontal coordinates are illustrated.

In FIG. 4B, a parallax value after applying the LPF which is denoted by being surrounded with the circle 427 is not applied with the LPF as a focused region even though it is a background region. For this reason, there is a problem in that a part of the background region of a composite image which corresponds to the parallax value after applying the LPF which is denoted by the circle 427 is not blurred.

FIG. 4C is a diagram which illustrates a parallax value after applying an LPF when the horizontal widths 431 and 432 of a kernel size of the LPF is the horizontal width of a window size at the time of generating a parallax map. In addition, in FIG. 4C, the numeral 433 denotes edges of an object. In addition, the numeral 434 denotes a parallax value after applying the LPF. In addition, the numeral 435 denotes a background. In addition, the numeral 436 denotes an expanded region by the half-value width of the window size.

In FIG. 4C, a parallax value before applying the LPF, and a parallax value after applying the LPF are illustrated with respect to coordinates in the horizontal direction of an image (hereinafter, referred to as image horizontal coordinates).

In FIG. 4C, the LPF is not applied to a focused region, and there is no problem in that a part of the focused region of a final composite image is blurred. In addition, it is possible to apply the LPF from edges to a background of an object with respect to a parallax value after converting. For this reason, it is possible to make a final composite image which is blurred from edges of the object as the background.

In addition, since the parallax value after applying the LPF is smoothly changed from the edges of the object toward the background, the blurring in the background region of the composite image is smoothly changed.

Accordingly, the LPF processing unit (filter processing unit for map) 22 calculates the parallax value d" after applying the LPF by applying the LPF with respect to parallax map using the same kernel size WW as the window size at the time of generating a parallax map. The LPF processing unit (filter processing unit for map) 22 outputs the information denoting the parallax value d" after applying the LPF to the blurring amount selection unit 23.

Figure 5A:
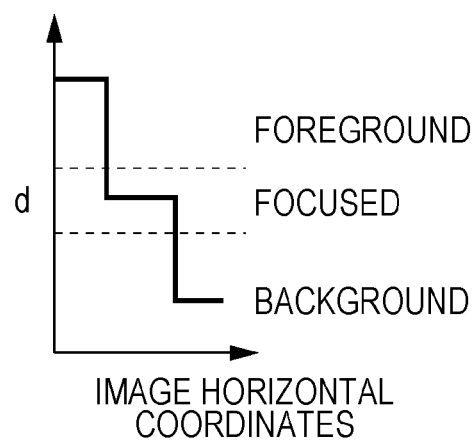
FIG. 5A is a diagram which illustrates an example of the original parallax value.
Figure 5B:
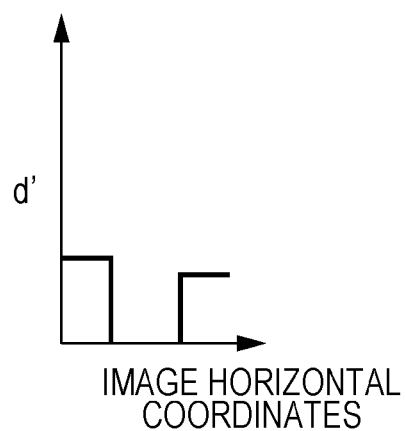
FIG. 5B is a diagram which illustrates an example of a parallax value after being converted using a regional division.
Figure 5C:
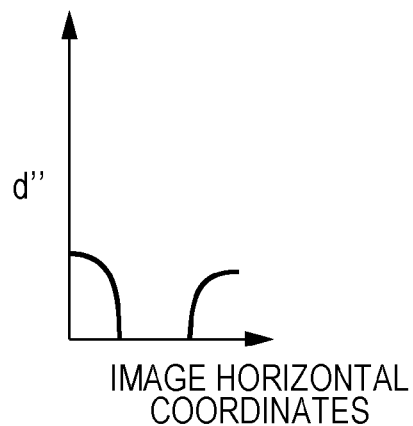
FIG. 5C is a diagram which illustrates an example of a smoothed parallax value after applying LPF.

FIGS. 5A to 5C are diagrams which illustrate examples of the original parallax value d (FIG. 5A), the parallax value d' after converting (FIG. 5B) using a parallax value conversion in each region, and the parallax value d" after applying the LPF (FIG. 5C).

FIG. 5A illustrates an example of a relationship between the original parallax value and image horizontal coordinates. In FIG. 5A, a horizontal axis indicates the image horizontal coordinates, and a vertical axis indicates the parallax value d. In the example, when facing the image horizontal coordinates, the left side (side close to the origin) is a foreground region, the center is a focused region, and the right side (side far from the origin) is a background region. Among the three regions, a parallax value of the foreground region is high, a parallax value of the focused region is approximately medium, and a parallax value of the background region is low.

FIG. 5B illustrates an example of a parallax value after converting using parallax value converting in each region by the parallax value converting unit of each region 21 with respect to the image horizontal coordinates. FIG. 5B illustrates a case in which the parallax value converting in each region is performed with respect to FIG. 5A. In FIG. 5B, the vertical axis is image horizontal coordinates, and a horizontal axis is the parallax value d' after converting. In the example, when facing the image horizontal coordinates, the left side is a foreground region, the center is a focused region, and the right side is a background region. It is denoted that the parallax value d' after converting in the foreground region and the background region takes a positive value, however, the value in the focused region takes 0. Here, at a boundary between the foreground region and the focused region, or at a boundary between the focused region and the background region, the parallax value d' after converting is rapidly changed with respect to the image horizontal coordinates.

According to the embodiment, FIG. 5C illustrates an example of a parallax value after applying an LPF by the LPF processing unit 22 with respect to image horizontal coordinates. In FIG. 5C, a horizontal axis is image horizontal coordinates, and a vertical axis is the parallax value d" after applying LPF. In the example, when facing the image horizontal coordinates, the left side is a foreground region, the center is a focused region, and the right side is a background region. Here, at a boundary between the foreground region and the focused region, or at a boundary between the focused region and the background region, the parallax value d" after applying the LPF is smoothly changed with respect to the image horizontal coordinates. FIG. 5C illustrates a case in which the LPF processing is performed with respect to FIG. 5B.

As described above, the LPF processing unit (filter processing unit for map) 22 applies an LPF with respect to a parallax map. In this manner, it is possible to make the parallax value d" after applying the LPF be smoothly changed with respect to the image horizontal coordinates at the boundary between the foreground region and the focused region, or at the boundary between the focused region and the background region.

In the image processing device 10, the parallax value converting unit of each region 21 divides a standard image into a foreground region, a background region, and a focused region, converts a parallax value, and then the LPF processing unit (filter processing unit for map) 22 performs LPF processing. In this manner, it is possible to prevent a generation of contour on the background region side due to an image which is close to edges of the focused region, in the vicinity of a region in which the focused region and the background region in the composite image come into contact with each other.

When the foreground, focused region, and the background are changed in order as illustrated in FIG. 5A, an image of a focused region appears between the foreground and the background in the composite image. For this reason, there is no case in which a parallax value becomes 0, even if when the image processing device 10 performs the LPF processing without performing parallax value converting in each region (as input parallax map is).

However, when the foreground region and the background region are overlapped in the composite image, that is, when the background region comes after the foreground region, and there is no focused region, the parallax value becomes 0 when, similarly, the image processing device performs the LPF processing without performing the parallax value converting in each region (input parallax map as is). For this reason, there is a problem that a focused image appears at a position at which a focused region is not present in the composite image, originally.

Since the parallax values of the foreground and the background after converting do not include the parallax value of the focused region when the parallax value converting unit of each region 21 performs the parallax value converting in each region, there is no case in which the parallax value after converting becomes 0. Accordingly, in a case in which the foreground region and the background region overlap with each other in the composite image, when the image processing device 10 performs the LPF processing after performing the parallax value converting in each region, a region in which the parallax value becomes 0 is not generated.

According to the embodiment, the LPF processing unit 22 performs the LPF processing after the parallax value converting unit of each region 21 performs the parallax value converting in each region. In this manner, it is possible to prevent a focused image from appearing in a region in which the region is changed from the foreground region to the background region in the composite image.

In addition, the LPF processing unit (filter processing unit for map) 22 may use a kernel of which values of factors become smaller when going toward the end from the center of tables T1 to T3 as illustrated in FIGS. 6 to 8, when applying filtering to a parallax map. In addition, all of the factors of the kernels may use the same kernel without being limited to this. For example, when the kernel is 3×3, all of the factors may be 1/9.

In addition, the LPF processing unit (filter processing unit for map) 22 performed filtering so that the parallax value after applying an LPF is smoothly changed from a position corresponding to edges of an object, as illustrated in FIG. 4C, however, it is not limited to this. For example, the filtering may be performed so that the parallax value after applying the LPF is smoothly changed from a position corresponding to pixels which are inside the object rather than the edges of the object, as illustrated in FIG. 4A. In this case, the image starts to be blurred from pixels which are inside the object.

Return to the description in FIG. 3, the blurring amount selection unit 23 reads out information denoting the step width DW, and information denoting the plurality of kernel sizes KS from the storage unit 11. The blurring amount selection unit 23 sets a threshold value in each the step width DW by the same number of types as the kernel sizes KS. For example, the blurring amount selection unit 23 sets the DW, DW×2, and DW×3 as threshold values since the number of types of the kernel size KS is 3.

When the parallax value d" after applying the LPF is 0, that is, in a case of a focused region, the blurring amount selection unit 23 sets a blurring amount table which identifies a table maintaining information of a kernel when applying the LPF to an image to 0, and puts up a focus flag FA.

On the other hand, when the parallax value d" after applying the LPF is smaller than the step width DW, that is, in a case of a small blurring amount, the blurring amount selection unit 23 sets a blurring amount table to 1, and does not put up a focus flag.

In cases other than the above case, when the parallax value d" after applying the LPF is smaller than twice of the step width DW, that is, in a case of an approximately medium blurring amount, the blurring amount selection unit 23 sets a blurring amount table to 2, and does not put up a focus flag.

In cases other than the above case, when the parallax value d" after applying the LPF is smaller than three times of the step width DW, that is, in a case of a large blurring amount, the blurring amount selection unit 23 sets a blurring amount table to 3, and does not put up a focus flag.

In cases other than the above case, that is, when the parallax value d" after applying the LPF exceeds three times of the step width DW, the blurring amount selection unit 23 sets a blurring amount table to 4, and does not put up a focus flag.

The blurring amount selection unit 23 outputs information denoting the focus flag to the image composition unit 40, and outputs information denoting the blurring amount table GT, and information denoting the parallax value d" after applying the LPF to the blurred image generation processing unit 30.

In addition, each interval from the step width DW1 to DW3 which is illustrated in FIG. 3 is not necessarily the fixed length (usually, interval of step width DW is constant), and may be variable.

Return to descriptions in FIG. 2, the blurred image generation processing unit 30 generates a blurred image based on information denoting a blurring amount which is input from the blurring amount selection unit 23, and IMGDATA as data of a standard image which is input from the outside. In addition, the blurred image generation processing unit 30 outputs the information denoting the blurred image GP to the image composition unit 40.

Figure 9:
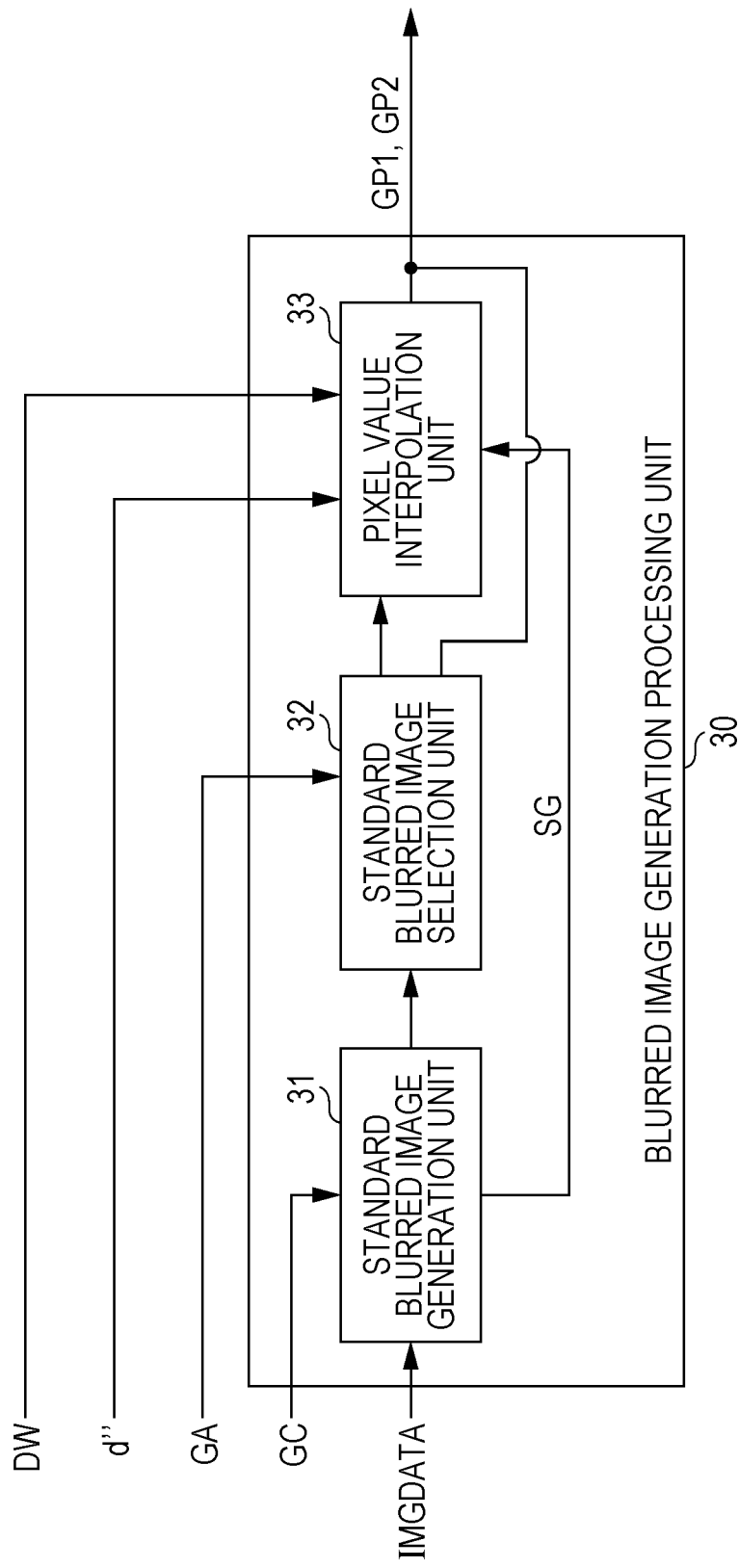
FIG. 9 is a block configuration diagram of a blurred image generation processing unit.

FIG. 9 is a block configuration diagram of the blurred image generation processing unit 30 (refer to FIG. 2). The blurred image generation processing unit 30 includes a standard blurred image generation unit 31, a standard blurred image selection unit 32, and a pixel value interpolation unit 33.

The number of standard blurred image which is generated by the standard blurred image generation unit 31 is the number of types of the kernel size KS. Here, a case in which the number of types of the kernel size KS is 3 will be described as an example. In addition, the number of types of the kernel size KS may be 1 or more. The more the number of the standard blurred images which is generated by the standard blurred image generation unit 31, the better the possibility to accurately interpolate each pixel value of a blurred image from the standard blurred image. For this reason, the image processing device 10 can generate a smooth blurred image corresponding to a distance from an object.

The standard blurred image generation unit 31 generates three types of standard blurred images by folding in each blurring coefficient GC of a kernel having three different kernel sizes, and IMGDATA as the data of the standard image which is supplied from the outside.

Specifically, the standard blurred image generation unit 31 generates a first standard blurred image (mildly blurred image) by folding in the kernel of the table T1 (3×3) which is illustrated in FIG. 6, and the IMGDATA as the data of the standard image. The standard blurred image generation unit 31 generates a second standard blurred image (medium-blurred image) by folding in the kernel of the table T2 (7×7) which is illustrated in FIG. 7, and the IMGDATA as the data of the standard image. The standard blurred image generation unit 31 generates a third standard blurred image (strongly blurred image) by folding in the kernel of the table T3 (15×15) which is illustrated in FIG. 8, and the IMGDATA as the data of the standard image.

Here, a blurring coefficient of a kernel corresponding to the respective blurred images will be described. FIG. 6 is a diagram which illustrates an example of a blurring coefficient of a kernel which is used when generating an image with a small blurring amount. In FIG. 6, as an example of a blurring coefficient of a kernel which is used when generating a blurred image (mild blurring) corresponding to the step width DW1 in FIG. 3, the table T1 of 3×3 is illustrated. In the table T1, the center factor among all of factors is 0.3446, the largest, and factors at four corners are 0.0386, the smallest.

FIG. 7 is a diagram which illustrates an example of a blurring coefficient of a kernel which is used when generating an image with an approximately medium blurring amount.

In FIG. 7, as an example of a blurring coefficient of a kernel which is used when generating a blurred image (medium blurring) corresponding to the step width DW2 in FIG. 3, the table T2 of 7×7 is illustrated. In the table T2, the center factor among all of the factors is 0.0324, the largest, the factors become smaller toward the end, and factors at the four corners are 0.0103, the smallest.

FIG. 8 is a diagram which illustrates an example of a blurring coefficient of a kernel which is used when generating an image with a large blurring amount.

In FIG. 8, as an example of the blurring coefficient of the kernel which is used when generating a blurred image (strong blurring) which corresponds to the step width DW3 in FIG. 3, the table T3 of 15×15 is illustrated. In the table T3, similarly to the table T2, the center factor among all of the factors is 0.006741, the largest, the factors become smaller toward the end, and factors at the four corners are 0.002038, the smallest.

In general, the larger the size of a kernel (size of table referred to here), the greater the blurring of an image after applying filtering using the kernel.

For example, here, the size of the table T2 is larger than the size of the table T1. For this reason, a blurring amount of an image which is generated by folding in the kernel which is illustrated in the table T2 and the image is larger than a blurring amount of an image which is generated by folding in the kernel which is illustrated in the table T1 and the image.

In addition, here, the size of the table T3 is larger than the size of the table T2. For this reason, a blurring amount of an image which is generated by folding in the kernel which is illustrated in the table T3 and the image is larger than a blurring amount of an image which is generated by folding in the kernel which is illustrated in the table T2 and the image.

Return to the descriptions in FIG. 9, the standard blurred image generation unit 31 outputs information denoting the generated three types of standard blurred images SG to the standard blurred image selection unit 32.

The standard blurred image selection unit 32 selects two blurred images in the vicinity of a parallax value of a target pixel in each pixel of the blurred image using information denoting a blurring amount which is input from the blurring amount selection unit 23.

For example, when a blurring amount is 1, the standard blurred image selection unit 32 selects a standard image and a mildly blurred image. When a blurring amount is 2, the standard blurred image selection unit 32 selects a mildly blurred image and a medium-blurred image. When a blurring amount is 3, the standard blurred image selection unit 32 selects a medium-blurred image and a strongly blurred image. When a blurring amount is 4, the standard blurred image selection unit 32 selects only a strongly blurred image, and outputs information denoting the strongly blurred image to the image composition unit 40 as is, without performing interpolation in the pixel value interpolation unit 33.

In addition, the standard blurred image selection unit 32 outputs selection information denoting which blurred image is selected to the pixel value interpolation unit 33 after the selection.

The pixel value interpolation unit 33 reads out the parallax value d" of the selected two blurred images, and information denoting the step width DW from the selection information denoting which blurred image is selected among the blurred images which are input from the standard blurred image selection unit 32. In addition, the pixel value interpolation unit 33 calculates a pixel value of a blurred image corresponding to the parallax value of the target pixel using linear interpolation based on the parallax value d" which is read out.

Figure 10:
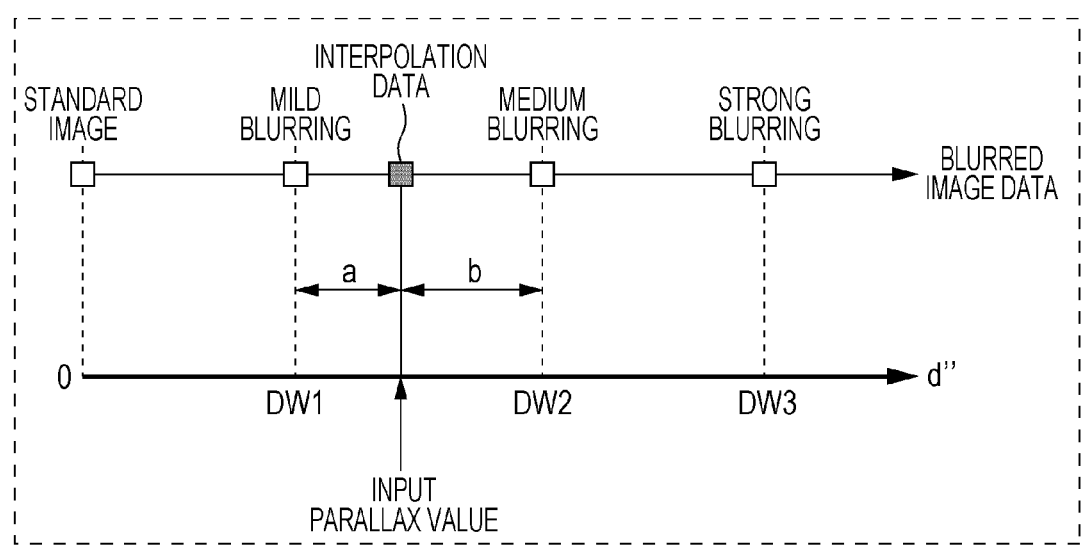
FIG. 10 is a diagram which describes a method of calculating a pixel value of each pixel of a blurred image using linear interpolation.

Further, the detailed processing of the pixel value interpolation unit 33 will be described using FIG. 10. FIG. 10 is a diagram which describes a method of calculating a pixel value of each pixel of a blurred image using the linear interpolation.

In FIG. 10, a pixel value of a blurred image which will be generated from now (data of blurred image) is illustrated on a horizontal axis on the upper row, and the parallax value d" after applying the LPF is illustrated on the horizontal axis on the lower row.

When an input parallax value $d"_{IN}$ which is one of the parallax values after applying the LPF d" is between the step width DW1 and the step width DW2, a ($=d"_{IN}-DW1$) which is a difference between the input parallax value $d"_{IN}$ and the step width DW1, and b ($=DW2-d"_{IN}$) which is a difference between the input parallax value $d"_{IN}$ and the step width DW2 are calculated.

When a luminance value of mild blurring is set to $Y_1$, and a luminance value of medium blurring is set to $Y_2$, a luminance value of a blurred image (interpolation data) Y is calculated using the following Expression (1).

$$Y=(Y_1 \times b+Y_2 \times a)/(a+b) \quad (1)$$

The pixel value interpolation unit 33 calculates a luminance value (interpolation data) of a blurred image with respect to each of luminance values of RGB (Red, Green, Blue) using the Expression (1). In addition, the pixel value interpolation unit 33 generates a focused image from a standard image with respect to a focused region.

The pixel value interpolation unit 33 generates a blurred image by performing the above processing with respect to all of pixels.

According to this, the pixel value interpolation unit 33 is able to calculate a pixel value of a target pixel by performing interpolation using a value based on a value of the parallax map after filtering the target pixel and a value which is selected from the parallax map, and a pixel value of a pixel corresponding to a position of the target pixel in the selected standard blurred image. In this manner, the pixel value interpolation unit 33 is able to generate an appropriate blurred image corresponding to a parallax value.

In addition, as described above, each interval from the step width DW1 to step width DW3 in FIG. 10 is not necessarily the fixed length (that is, interval of DW is usually constant), and each interval can be set to be variable. In addition, when each interval is set to be variable, a value of a denominator (a+b) of Expression (1) is also variable due to each interval of the step width DW1 to step width DW3.

Further, as in the descriptions of the standard blurred image generation unit 31, the number of the step width DW (number of types of kernel sizes KS) may be one or more. Since the larger the number of the step width DW, it is possible to accurately interpolate each pixel value of a blurred image from the standard blurred image, the image processing device 10 can generate a smooth blurred image corresponding to a distance from an object.

The blurred image generation processing unit 30 performs the above described series of blurred image generation processing with respect to each of a foreground region and a background region, and generates a blurred image of the foreground region and a blurred image of the background region.

The blurred image generation processing unit 30 outputs data of the blurred image GP1 of the foreground region, and data of the blurred image GP2 of the background region which are generated to the image composition unit 40.

Return to the descriptions in FIG. 2, the image composition unit 40 sets a luminance value in a focused region of data of a standard image to a luminance value of a composite image with respect to a pixel of which a focus flag which is input from the blurring amount selection unit 23 is 1.

On the other hand, the image composition unit 40 sets a luminance value of a blurred image to a luminance value of a composite image with respect to a pixel of which a focus flag which is input from the blurring amount selection unit 23 is 0. In this manner, the image composition unit 40 is able to make only a non-focused region blurry, leaving the pixel in the focused region blurry as is.

The image composition unit 40 generates a composite image when a luminance value of each region of a background region, a focused region, and a foreground region substitutes for a luminance value of the composite image in order. The image composition unit 40 outputs generated data of the composite image IMGDATAOUT to the outside.

Figure 11:
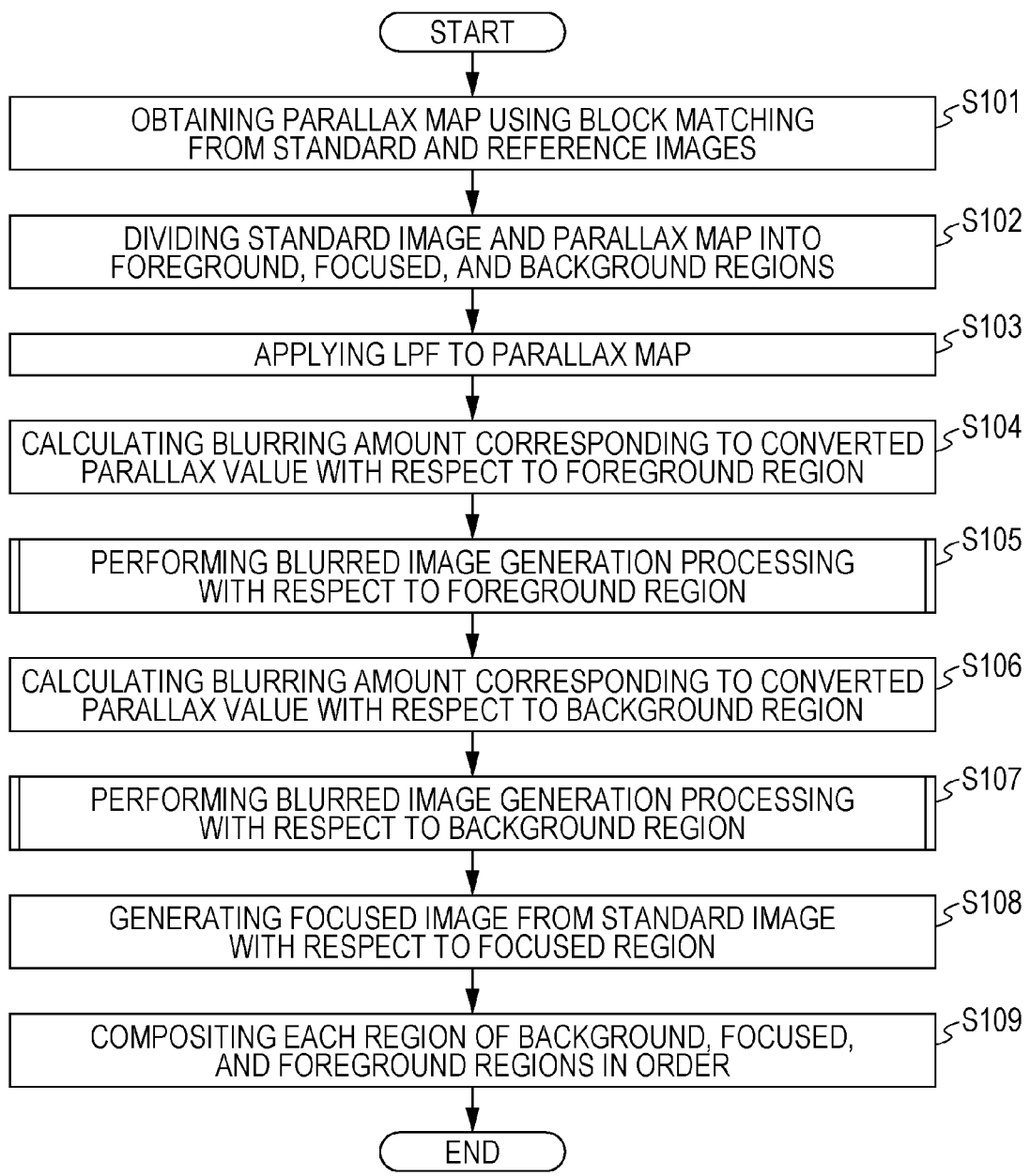
FIG. 11 is a flowchart which illustrates a flow of processing of the image processing device according to the first embodiment of the present invention.

FIG. 11 is a flowchart which illustrates a flow of processing of the image processing device 10 (refer to FIG. 2) according to the first embodiment of the present invention.

First, the parallax map generation unit 12 generates a parallax map using block matching from a standard image, and a reference image (step S101).

Subsequently, the parallax value converting unit of each region 21 divides the reference image and a parallax map into a foreground region, a focused region, and a background region, and converts a parallax value using the above described method (step S102).

Subsequently, the LPF processing unit (filter processing unit for map) 22 applies the LPF to the converted parallax map (step S103).

Subsequently, the blurring amount selection unit 23 calculates a blurring amount (table) corresponding to the converted parallax value with respect to the foreground region (step S104).

Subsequently, the blurred image generation processing unit 30 selects a blurred image of a corresponding kernel size from the blurring amount (table) with respect to the foreground region, and performs blurred image generation processing corresponding to the converted parallax value (step S105).

Subsequently, the blurring amount selection unit 23 calculates a blurring amount (table) corresponding to the converted parallax value with respect to the background region (step S106).

Subsequently, the blurred image generation processing unit 30 selects a blurred image of a corresponding kernel size from the blurring amount (table) with respect to the background region, and performs blurred image generation processing corresponding to the converted parallax value (step S107).

Subsequently, the blurred image generation processing unit 30 generates a focused image from a standard image with respect to the focused region (step S108).

Subsequently, the image composition unit 40 composites each region of the background region, the focused region, and the foreground region by overlapping thereof (step S109).

In this manner, processing of the flowchart in FIG. 11 is ended.

Subsequently, detailed blurred image generation processing by the blurred image generation processing unit 30 in steps S105 and S107 in FIG. 11 will be described using FIG. 12.

Figure 12:
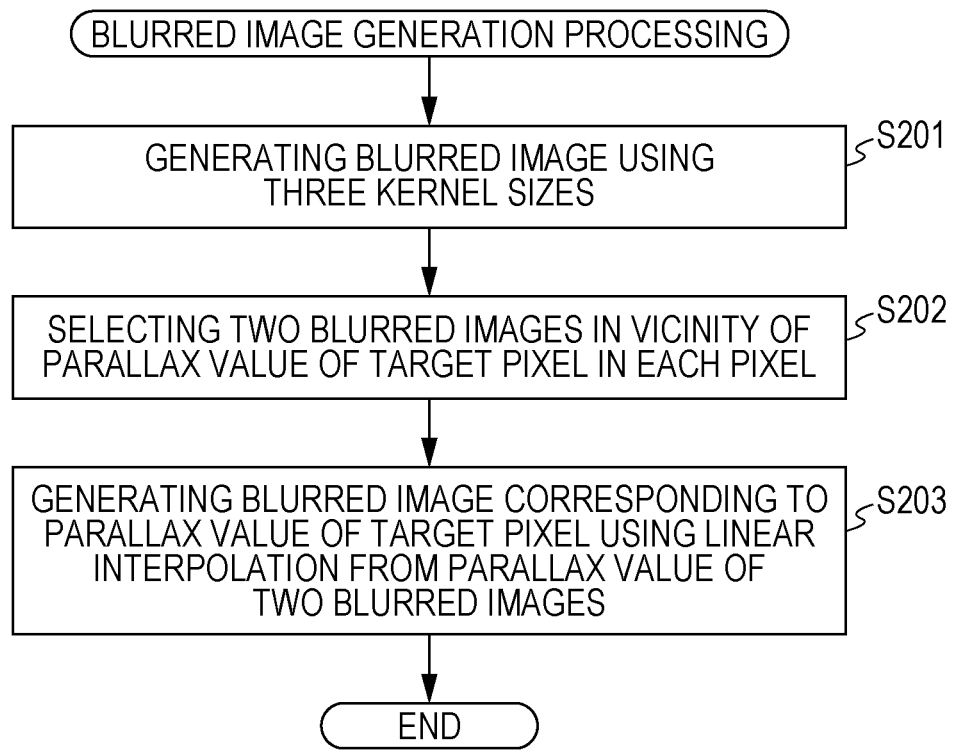
FIG. 12 is a flowchart which illustrates a flow of processing of a blurred image generation processing unit 30 according to the first embodiment of the present invention.

FIG. 12 is a flowchart which illustrates a flow of processing of the blurred image generation processing unit 30 according to the first embodiment of the present invention.

First, the standard blurred image generation unit 31 generates blurred images of three kernel sizes (step S201). Subsequently, the standard blurred image selection unit 32 selects two blurred images in the vicinity of a parallax value of a target pixel in each pixel (step S202).

Subsequently, the pixel value interpolation unit 33 generates a blurred image corresponding to a parallax value of a target pixel from a parallax value of the two blurred images using linear interpolation (step S203).

In this manner, the processing of the flowchart in FIG. 12 is ended.

As described above, the image processing device 10 is able to convert a parallax value in an expansion region so as to be smoothly changed by applying an LPF to a parallax map from a position corresponding to edges of an object. In this manner, the image processing device 10 is able to change a filtering size which is used in blurring according to a parallax value after applying the LPF.

By applying an LPF to a parallax map from a position corresponding to edges of an object, blurring from a foreground region to a focused region is smoothly changed even in an expanded parallax map, and it is possible to make a boundary at a switching portion between the foreground region and a focused region less noticeable.

In addition, since it is possible to make an image in a background region in the vicinity of a focused region not be included in the focused region, it is possible to make a pixel value of a focusing component which is generated in the image in the background region at the switching portion between the focused region and background region less noticeable.

In addition, the image processing device 10 is able to generate a plurality of blurred images with a blurring amount corresponding to a plurality of values which are selected from parallax values after applying an LPF, and to generate a composite image by linear interpolation using a pixel value of a blurred image according to the pixel value after applying the LPF. In this manner, it is possible to make the blurring of an image natural based on the depth in a foreground region and a background region.

<Second Embodiment>

Figure 13:
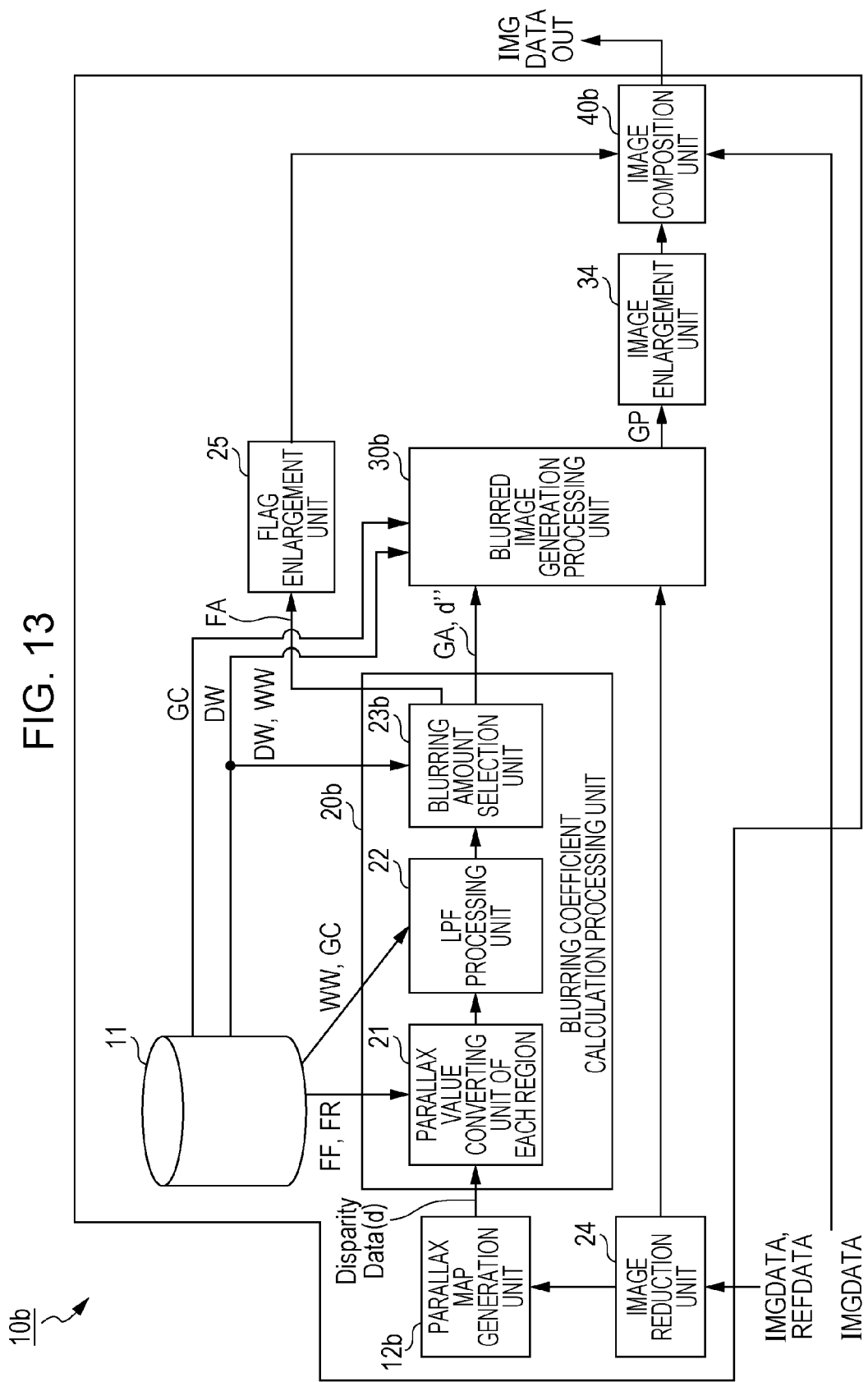
FIG. 13 is a block configuration diagram of an image processing device according to a second embodiment of the present invention.

Subsequently, a second embodiment of the present invention will be described. FIG. 13 is a block configuration diagram of an image processing device 10b according to the second embodiment of the present invention. In addition, elements which are common to FIG. 2 are given the same reference numerals, and descriptions thereof will be omitted.

When comparing a configuration of the image processing device 10b in FIG. 13 to the configuration of the image processing device 10 in FIG. 2, an image reduction unit 24, a flag enlargement unit 25, and an image enlargement unit 34 are added thereto.

In addition, when comparing the configuration of the image processing device 10b in FIG. 13 to the configuration of the image processing device 10 in FIG. 2, the parallax map generation unit 12 is changed to a parallax map generation unit 12b. In addition, the blurring coefficient calculation processing unit 20 is changed to a blurring coefficient calculation processing unit 20b. In addition, the blurring amount selection unit 23 is changed to a blurring amount selection unit 23b. In addition, the blurred image generation processing unit 30 is changed to a blurred image generation processing unit 30b. In addition, the image composition unit 40 is changed to an image composition unit 40b.

The image reduction unit 24 reduces a standard image which is input from the outside, and a reference image to a predetermined magnification (for example, ¼). In addition, the image reduction unit 24 outputs data of the reduced standard image, and data of the reduced reference image to the parallax map generation unit 12b. In addition, the image division unit 24 outputs the data of the reduced standard image to the blurred image generation processing unit 30b.

Similarly to the parallax map generation unit 12 according to the first embodiment, the parallax map generation unit 12b generates a parallax map by the well-known block matching method using a predetermined window size WW from data of the reduced standard image which is input from the image reduction unit 24, and the data of the reduced reference image. The parallax map generation unit 12b outputs Disparity Data as parallax value data which forms a generated parallax map to a parallax value converting unit of each region 21 of a blurring coefficient calculation processing unit 20.

Similarly to the blurring amount selection unit 23 according to the first embodiment, the blurring amount selection unit 23b calculates a blurring amount and a focus flag, and output information denoting the focus flag to the flag enlargement unit 25. In addition, the blurring amount selection unit 23b outputs information denoting the calculated blurring amount to the blurred image generation processing unit 30b.

The flag enlargement unit 25 enlarges a focused region of which a focus flag is 1 using the same magnification as the magnification with which the image enlargement unit 34 which will be described later enlarges a blurred image (for example, four times) using information denoting a focus flag which is input from a filtering magnitude selection unit 23*b*. The flag expansion unit 25 outputs information on the enlarged focused region to the image composition unit 40*b*.

Similarly to the blurred image generation processing unit 30 according to the first embodiment, the blurred image generation processing unit 30*b* generates blurred images of a foreground region and a background region based on information denoting an input blurring amount, and data of the reduced standard image. The blurred image generation processing unit 30*b* outputs data of the blurred image of the foreground region, and data of the blurred image of the background region which are generated to the image enlargement unit 34.

The image enlargement unit 34 enlarges the input blurred image in the foreground region by a well-known bilinear interpolation using reciprocal magnification (for example, four times) of reduction magnification in the image reduction unit 24. Similarly, the image enlargement unit 34 enlarges the input blurred image in the background region by the bilinear interpolation using the reciprocal magnification (for example, four times) of the reduction magnification in the image reduction unit 24. In addition, the interpolation is not limited to the bilinear interpolation.

The image enlargement unit 34 outputs data of the enlarged blurred image in the foreground region, and data of the enlarged blurred image in the background region to the image composition unit 40*b*.

In addition, the image enlargement unit 34 enlarges the blurred image using the reciprocal magnification of the reduction magnification in the image reduction unit 24, however, it is not limited to this, and the blurred image may be enlarged using magnification which fits an image size of a composite image which is desired to be finally obtained.

The image composition unit 40*b* generates a focused image from the standard image before reducing which is input from the outside with respect to the enlarged focused region using information on the enlarged focused region which is input from the flag enlargement unit 25. Similarly to the image composition unit 40, the image composition unit 40*b* composites each region of the background region, the focused region, and the foreground region in order, and generates a composite image. The image composition unit 40*b* outputs generated data of the composite image IMGDATAOUT to the outside.

FIG. 14 is a flowchart which illustrates a flow of processing of the image processing device 10*b* according to the second embodiment of the present invention. First, the image reduction unit 24 reduces a standard image and a reference image to predetermined magnification (for example, ¼)(step S301).

Subsequently, the parallax map generation unit 12*b* obtains a parallax map using block matching from the reduced standard image and the reduced reference image (step S302).

Subsequently, the parallax value converting unit of each region 21 divides the reduced standard image and the parallax map into a foreground region, a focused region, and a background region (step S303).

Subsequently, the LPF processing unit (filter processing unit for map) 22 apply an LPF to the parallax map (step S304).

Subsequently, the blurred image generation processing unit 30*b* calculates a blurring amount (table) corresponding the converted parallax value with respect to a foreground region of the reduced standard image (step S305).

Subsequently, the blurred image generation processing unit 30*b* selects a blurred image of a kernel size corresponding to the blurring amount (table), and performs blurred image generation processing corresponding to the converted parallax value in the flow of the processing which is illustrated in FIG. 12 (step S306).

Subsequently, the blurred image generation processing unit 30*b* calculates a blurring amount (table) corresponding to the converted parallax value with respect to a background region of the reduced standard image (step S307).

Subsequently, the blurred image generation processing unit 30*b* selects a blurred image of a corresponding kernel size from the blurring amount (table) in the flow of the processing which is illustrated in FIG. 12, and performs the blurred image generation processing corresponding to the converted parallax value of the corresponding kernel size from the blurring amount (table) with respect to the background region of the reduced standard image (step S308).

Subsequently, the image enlargement unit 34 enlarges the blurred image of the foreground region, and the blurred image of the background region to a predetermined magnification (for example, four times) using the bilinear interpolation. Subsequently, the flag enlargement unit 25 enlarges a focus flag using a nearest neighbor method (step S310).

Subsequently, the image composition unit 40*b* generates a focused image from the standard image before reducing using the enlarged focused image (step S311).

Subsequently, the image composition unit 40*b* composites each region of the background region, the focused region, and the foreground region in order (step S312).

In this manner, the processing in the flowchart in FIG. 14 is ended.

In this manner, in the image processing device 10*b*, due to the reducing of the standard image as the input image, and the reference image, depth resolution is reduced, and a change in a depth value in one object becomes small. For this reason, it is possible to reduce a frequency of occurring of blurring in the middle of changing in the object which is changing in the depth direction.

In addition, a program for executing each processing of the image processing device 10 (refer to FIG. 2) according to the first embodiment of the present invention, and of the image processing device 10*b* (refer to FIG. 13) according to the second embodiment of the present invention may be recorded in a computer-readable recording medium. In addition, the above described various processing relating to the image processing devices 10 and 10*b* may be performed by causing a computer system to read the program which is recorded in the recording medium, and execute thereof.

In addition, the "computer system" which is referred to here may be a system which includes hardware such as an Operating System (OS), peripheral equipment, or the like. In addition, when the "computer system" is using the World Wide Web (WWW) system, the system also includes a homepage offering environment (or, display environment). In addition, the "computer-readable recording medium" includes a writable non-volatile memory such as a flexible disk, a magneto-optical disc, a ROM (Read Only Memory), and a flash memory, a portable medium such as a CD-ROM (Compact Disc-Read Only Memory), and a recording device such as a hard disk which is embedded in the computer system.

In addition, the "computer-readable recording medium" also includes a medium which maintains a program for a certain period such as a network such as the Internet, a server in a case in which a program is transmitted through a communication line such as a telephone line, or a volatile memory in the computer system as a client (for example, DRAM (Dynamic Random Access Memory)). In addition, the program may be transmitted to another computer system through a transmission medium, or a transmission wave in the transmission medium from the computer system in which the program is stored in a recording device, or the like. Here, the "transmission medium" which transmits the program means a medium with a function of transmitting information such as a network (communication network) such as the Internet, or a communication line such as a telephone line. In addition, the program may be a program for executing a part of the above described functions. In addition, the program may be a program which can be executed by being in combination with the program which is recorded with the above described function in advance in the computer system, that is, a so-called difference file (difference program).

As described above, the embodiments of the present invention have been described with reference to drawings, however, the specific configuration is not limited to the embodiments, and also includes designs which are not departing from the scope of the present invention, or the like.

INDUSTRIAL APPLICABILITY

The present invention can be applied to an image processing device which generates an image in which blurring becomes smooth in a boundary region between an object and a background, or between the object and a foreground, an image processing method, and an image processing program thereof.

REFERENCE SIGNS LIST 10, 10b IMAGE PROCESSING DEVICE
11 STORAGE UNIT
12, 12b PARALLAX MAP GENERATION UNIT
20, 20b BLURRING COEFFICIENT CALCULATION UNIT
21 PARALLAX VALUE CONVERTING UNIT OF EACH REGION (REGION DIVISION UNIT)
22 LPF PROCESSING UNIT (FILTER PROCESSING UNIT FOR MAP)
23 BLURRED REGION SELECTION UNIT (FILTERING MAGNITUDE SELECTION UNIT)
24 IMAGE REDUCTION UNIT
25 FLAG ENLARGEMENT UNIT
30 BLURRED IMAGE GENERATION PROCESSING UNIT
31 STANDARD BLURRED IMAGE GENERATION UNIT
32 STANDARD BLURRED IMAGE SELECTION UNIT
33 PIXEL VALUE INTERPOLATION UNIT
34 IMAGE ENLARGEMENT UNIT
40, 40b IMAGE COMPOSITION UNIT

The invention claimed is:

1. An image processing device comprising:
a region divider configured or programmed to divide an image into a predetermined region according to a parallax value with respect to each pixel of the image, and convert the parallax value for each region;
a map filtering processor configured or programmed to apply filtering to the parallax map based on the parallax value converted by the region divider;
a filtering magnitude selector configured or programmed to select a magnitude of an image filtering corresponding to the parallax map applied with the filtering by the map filtering processor;
a blurred image generator configured or programmed to generate a blurred image of the image by applying the image filtering to the image; and
an image composer configured or programmed to generate a composite image obtained by compositing the image and the blurred image based on the parallax map after the filtering by the map filtering processor.

2. An image processing device comprising:
a map filtering processor configured or programmed to apply filtering to a parallax map based on a parallax value with respect to each pixel of an image;
an image reducer configured or programmed to reduce a size of the image;
a blurred image generator configured or programmed to generate a blurred image of the image which is reduced by the image reducer
an image enlarger configured or programmed to enlarge the blurred image of the reduced image to a predetermined size; and
an image composer configured or programmed to generate a composite image obtained by compositing the image and the blurred image based on the parallax map after the filtering by the map filtering processor.

3. An image processing device comprising:
a map filtering processor configured or programmed to apply filtering to a parallax map based on a parallax value with respect to each pixel of an image;
a blurred image generator configured or programmed to generate a blurred image from the image; and
an image composer configured or programmed to generate a composite image obtained by compositing the image and the blurred image based on the parallax map after the filtering by the map filtering processor,
wherein the blurred image generator includes:
a standard blurred image generator configured or programmed to select a plurality of values from the parallax map, and to generate a standard blurred image with a blurring amount corresponding to each of the selected plurality of values;
a standard blurred image selector configured or programmed to select a standard blurred image from the standard blurred image based on a comparison between a value of the parallax map after filtering of a target pixel and the selected value for each target pixel of the image; and
a pixel value interpolator configured or programmed to calculate a pixel value of the target pixel based on a pixel value of a pixel corresponding to a position of the target pixel among the selected standard blurred images, a value of the parallax map after filtering of the target pixel, and the selected value.

4. The image processing device according to claim 3, wherein the pixel value interpolator is configured or programmed to calculate a pixel value of the target pixel by interpolation using a value based on a value of the parallax map after filtering of the target pixel, and the selected value, and a pixel value of a pixel corresponding to a position of the target pixel among the selected standard blurred images.

5. An image processing method comprising:
dividing an image into a predetermined region according to a parallax value with respect to each pixel of the image, and converting the parallax value for each region;
applying filtering to the parallax map based on the parallax value converted;
selecting a magnitude of an image filtering corresponding to the parallax map applied with the filtering;
generating a blurred image of the image by applying the image filtering to the image; and generating a composite image obtained by compositing the image and the blurred image based on the parallax map after applying the filtering.

6. A computer-program product comprising a non-transitory computer readable recording medium encoded with an image processing program for use in an image processing device, the program when executed performs the operations comprising:

dividing an image into a predetermined region according to a parallax value with respect to each pixel of the image, and converting the parallax value for each region;

applying filtering to the parallax map based on the parallax value converted;

selecting a magnitude of an image filtering corresponding to the parallax map applied with the filtering;

generating a blurred image of the image by applying the image filtering to the image; and generating a composite image obtained by compositing the image and the blurred image based on the parallax map after applying the filtering.

* * * * *